United States Patent
Catovic

(10) Patent No.: US 9,042,264 B2
(45) Date of Patent: May 26, 2015

(54) AUTOMATIC CONFIGURATION OF THE CELL SIZE PARAMETER

(75) Inventor: Amer Catovic, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 236 days.

(21) Appl. No.: 12/732,811

(22) Filed: Mar. 26, 2010

(65) Prior Publication Data

US 2010/0246440 A1 Sep. 30, 2010

Related U.S. Application Data

(60) Provisional application No. 61/164,848, filed on Mar. 30, 2009.

(51) Int. Cl.
*H04W 24/02* (2009.01)
*H04W 16/18* (2009.01)

(52) U.S. Cl.
CPC .............. *H04W 24/02* (2013.01); *H04W 16/18* (2013.01)

(58) Field of Classification Search
CPC ... H04W 84/045; H04W 24/02; H04W 88/08; H04W 72/04; H04L 5/0007
USPC ............... 370/329, 331, 335; 455/422.1, 436, 455/444, 456.1–456.6
See application file for complete search history.

(56) References Cited

U.S. PATENT DOCUMENTS 6,233,449 B1 * 5/2001 Glitho et al. .................. 455/423
(Continued)

FOREIGN PATENT DOCUMENTS

| EP | 0505341 A2 | 9/1992 |
|---|---|---|
| WO | WO0056100 A1 | 9/2000 |
| WO | WO0247421 A1 | 6/2002 |
| WO | WO-2008063109 A1 | 5/2008 |

OTHER PUBLICATIONS

3GPP TS 36.423, V9.1.0, 3rd Generation Partnership Project; Technical Specification Group Radio Access Network; Evolved Universal Terrestrial Radio Access Network (E-UTRAN); X2 application protocol (X2AP) (Release 9), Sections 9.2.38 through 9.2.42, Dec. 2009.

(Continued)

*Primary Examiner* — Jung Park
(74) *Attorney, Agent, or Firm* — John J. Ketchum

(57) ABSTRACT

Systems and methodologies are described that facilitate automatically configuring a network configuration parameter (e.g., cell size parameter, . . . ) in a wireless communication environment. Size of an area served by a cell associated with a base station can be detected automatically by the base station. For example, size of the area served by the cell can be detected based upon location information of UE(s) served by the cell, a path loss between the base station and the UE(s) served by the cell, and/or a transmit power level of a reference signal sent by the base station. Moreover, a value of a network configuration parameter (e.g., cell size parameter, . . . ) can be automatically assigned by the base station as a function of a comparison between the size of the area served by the cell and a set of thresholds. For instance, the set of thresholds can be configurable by a network operator.

43 Claims, 11 Drawing Sheets

(56) References Cited

U.S. PATENT DOCUMENTS

| | | | | |
|---|---|---|---|---|
| 8,050,686 | B1* | 11/2011 | Souissi et al. | 455/456.1 |
| 2008/0064361 | A1* | 3/2008 | Bjork et al. | 455/403 |
| 2009/0046573 | A1* | 2/2009 | Damnjanovic | 370/216 |
| 2009/0052420 | A1 | 2/2009 | Fischer | |
| 2010/0061343 | A1* | 3/2010 | Kazmi et al. | 370/332 |
| 2011/0201339 | A1* | 8/2011 | Kuningas | 455/436 |

OTHER PUBLICATIONS

International Search Report and Written Opinion—PCT/US2010/029258—ISA/EPO—Jun. 23, 2010.

Taiwan Search Report—TW099109695—TIPO—Jan. 2, 2014.

\* cited by examiner

AUTOMATIC CONFIGURATION OF THE CELL SIZE PARAMETER

CROSS-REFERENCE TO RELATED APPLICATIONS

This application claims the benefit of U.S. Provisional Patent Application Ser. No. 61/164,848 entitled "METHOD AND APPARATUS FOR AUTO-CONFIGURATION OF THE CELL TYPE PARAMETER" which was filed Mar. 30, 2009. The entirety of the aforementioned application is herein incorporated by reference.

BACKGROUND

I. Field

The following description relates generally to wireless communications, and more particularly to automatic configuration of a value of a cell size parameter in a wireless communication system.

II. Background

Wireless communication systems are widely deployed to provide various types of communication content such as, for example, voice, data, and so on. Typical wireless communication systems can be multiple-access systems capable of supporting communication with multiple users by sharing available system resources (e.g., bandwidth, transmit power, . . . ). Examples of such multiple-access systems can include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), multi-carrier wireless specifications such as evolution data optimized (EV-DO), one or more revisions thereof, etc.

Generally, wireless multiple-access communication systems can simultaneously support communication for multiple user equipments (UEs). Each UE can communicate with one or more base stations via transmissions on forward and reverse links. The forward link (or downlink) refers to the communication link from base stations to UEs, and the reverse link (or uplink) refers to the communication link from UEs to base stations. Further, communications between UEs and base stations can be established via single-input single-output (SISO) systems, multiple-input single-output (MISO), multiple-input multiple-output (MIMO) systems, and so forth. In addition, UEs can communicate with other UEs (and/or base stations with other base stations) in peer-to-peer wireless network configurations.

Heterogeneous wireless communication systems commonly can include various types of base stations, each of which can be associated with differing cell sizes. For instance, macro cell base stations typically leverage antenna(s) installed on masts, rooftops, other existing structures, or the like. Further, macro cell base stations oftentimes have power outputs on the order of tens of watts, and can provide coverage for large areas. The femto cell base station is another class of base station that has recently emerged. Femto cell base stations are commonly designed for residential or small business environments, and can provide wireless coverage to UEs using a wireless technology (e.g., 3GPP Universal Mobile Telecommunications System (UMTS) or LTE, 1× Evolution-Data Optimized (1×EV-DO), . . . ) to communicate with the UEs and an existing broadband Internet connection (e.g., digital subscriber line (DSL), cable, . . . ) for backhaul. A femto cell base station can also be referred to as a Home Evolved Node B (HeNB), a Home Node B (HNB), a femto cell, an access point base station, or the like. Examples of other types of base stations include pico cell base stations, micro cell base stations, and so forth.

A base station is commonly associated with a cell size parameter. The cell size parameter can represent a size of an area served by a cell associated with the base station. The cell size parameter is typically configured by a network operator. Yet, configuration of the cell size parameter by the network operator can be time consuming, such that it can become infeasible as a number of cells in a network increases. Moreover, the network operator can be unaware of the size of the area served for a subset of the cells; for instance, the size of the area served by a cell can depend on factors not entirely known to the network operator such as morphology of the area, geographical distribution of UEs, size of coverage areas of surrounding cells, and the like. Lack of knowledge of the size of the area served by a cell can lead to inaccurate assignment of the cell size parameter by the network operator, which can mitigate benefits associated with utilization of such parameter.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating automatic configuration of a network configuration parameter (e.g., cell size parameter, . . . ) in a wireless communication environment. Size of an area served by a cell associated with a base station can be detected automatically by the base station. For example, size of the area served by the cell can be detected based upon location information of UE(s) served by the cell, a path loss between the base station and the UE(s) served by the cell, and/or a transmit power level of a reference signal sent by the base station. Moreover, a value of a network configuration parameter (e.g., cell size parameter, . . . ) can be automatically assigned by the base station as a function of a comparison between the size of the area served by the cell and a set of thresholds. For instance, the set of thresholds can be configurable by a network operator.

According to related aspects, a method that facilitates automatic network configuration in a wireless communication environment is described herein. The method can include detecting a size of an area served by a cell associated with a base station automatically at the base station. Moreover, the method can include assigning a value of a network configuration parameter as a function of the size of the area served by the cell automatically at the base station.

Another aspect relates to a wireless communications apparatus. The wireless communications apparatus can include a memory that retains instructions related to automatically determining a size of an area served by a cell associated with a base station, and automatically configuring a value of a network configuration parameter as a function of the size of the area served by the cell. Further, the wireless communications apparatus can include a processor, coupled to the memory, configured to execute the instructions retained in the memory.

Yet another aspect relates to a wireless communications apparatus that enables automatically setting a parameter value in a wireless communication environment. The wireless communications apparatus can include means for detecting a size of an area served by a cell associated with a base station automatically at the base station. Moreover, the wireless communications apparatus can include means for configuring a value of a network configuration parameter based upon the size of the area served by the cell and a set of thresholds automatically at the base station.

Still another aspect relates to a computer program product that can comprise a computer-readable medium. The computer-readable medium can include code for detecting a size of an area served by a cell associated with a base station automatically at the base station. Moreover, the computer-readable medium can include code for assigning a value of a network configuration parameter based upon the size of the area served by the cell and a set of thresholds automatically at the base station.

In accordance with another aspect, a wireless communications apparatus can include a processor, wherein the processor can be configured to detect a size of an area served by a cell associated with a base station automatically at the base station as a function of at least one of location information of one or more user equipments (UEs) served by the cell, a path loss between the base station and the one or more UEs served by the cell, or a transmit power level of a reference signal sent by the base station. Further, the processor can be configured to assign a value of a network configuration parameter as a function of a comparison between the size of the area served by the cell and a set of thresholds automatically at the base station.

Toward the accomplishment of the foregoing and related ends, the one or more embodiments comprise the features hereinafter fully described and particularly pointed out in the claims. The following description and the annexed drawings set forth herein detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
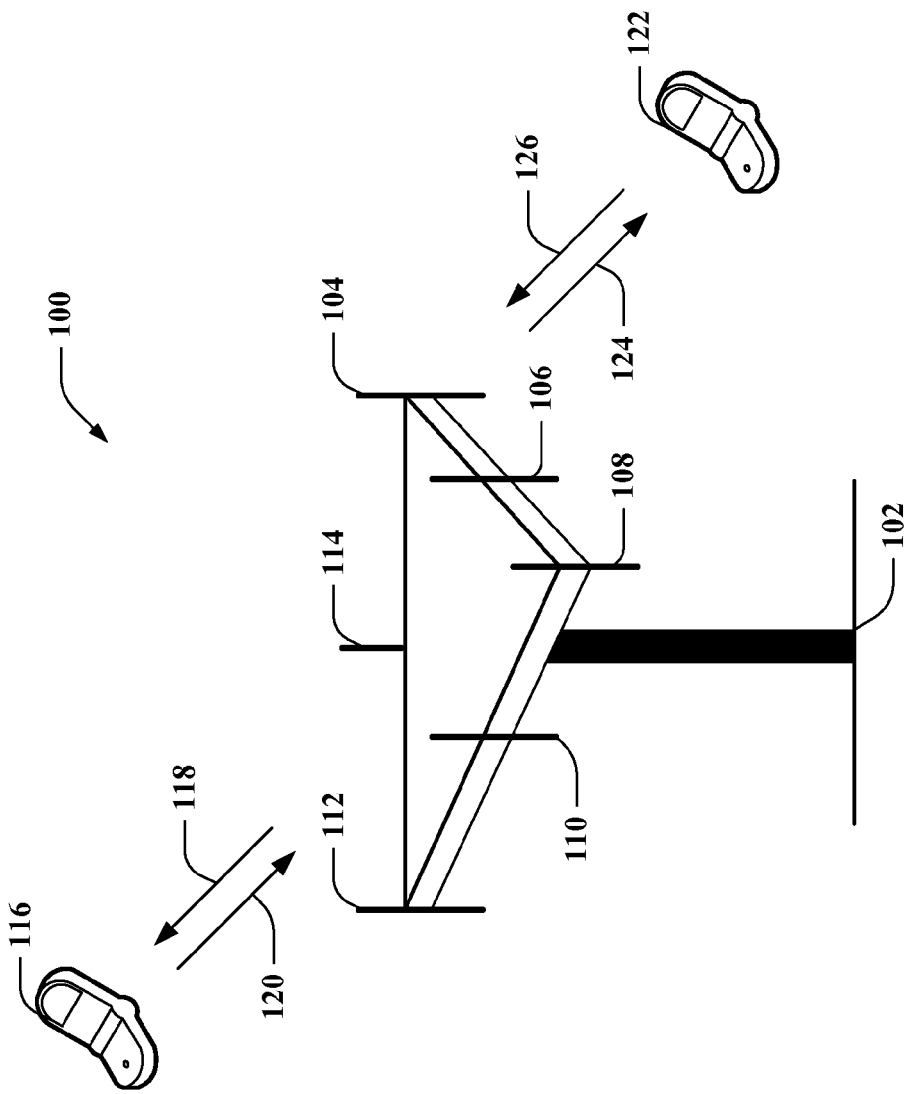
FIG. 1 is an illustration of a wireless communication system in accordance with various aspects set forth herein.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspects(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Various techniques described herein can be used for various wireless communication systems, such as code division multiple access (CDMA) systems, time division multiple access (TDMA) systems, frequency division multiple access (FDMA) systems, orthogonal frequency division multiple access (OFDMA) systems, single carrier-frequency division multiple access (SC-FDMA) systems, and other such systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95, and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits UEs in terms of transmit power efficiency. Accordingly, SC-FDMA can be implemented as an uplink multiple access scheme in 3GPP Long Term Evolution (LTE) or Evolved UTRA.

Furthermore, various aspects are described herein in connection with a user equipment (UE). A UE can refer to a device providing voice and/or data connectivity. A UE can be connected to a computing device such as a laptop computer or desktop computer, or it can be a self-contained device such as a personal digital assistant (PDA). A UE can also be called a system, subscriber unit, subscriber station, mobile station, mobile, remote station, remote terminal, mobile device, user terminal, terminal, wireless communication device, user agent, user device, or access terminal A UE can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various aspects are described herein in connection with a base station. A base station can be utilized for communicating with UE(s) and can also be referred to as an access point, Node B, Evolved Node B (eNodeB, eNB) or some other terminology. A base station can refer to a device in an access network that communicates over the air interface, through one or more sectors, with UEs. The base station can act as a router between the wireless terminal and the rest of the access network, which can include an Internet Protocol (IP) network, by converting received air interface frames to IP packets. The base station can also coordinate management of attributes for the air interface.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various aspects will be presented in terms of systems that can include a number of devices, components, modules, and the like. It is to be understood and appreciated that the various systems can include additional devices, components, modules, etc. and/or one or more of the devices, components, modules etc. discussed in connection with the figures need not be included. A combination of these approaches can also be used.

Referring now to FIG. 1, a system 100 is illustrated in accordance with various aspects presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more user equipments (UEs) such as UE 116 and UE 122; however, it is to be appreciated that base station 102 can communicate with substantially any number of UEs similar to UE 116 and UE 122. UE 116 and UE 122 can be, for example, cellular phones, smart phones, laptops, handheld communication devices, handheld computing devices, satellite radios, global positioning systems, PDAs, and/or any other suitable device for communicating over system 100. As depicted, UE 116 is in communication with antennas 112 and 114, where antennas 112 and 114 transmit information to UE 116 over a forward link 118 and receive information from UE 116 over a reverse link 120. Moreover, UE 122 is in communication with antennas 104 and 106, where antennas 104 and 106 transmit information to UE 122 over a forward link 124 and receive information from UE 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to UEs in a sector of the areas covered by base station 102. In communication over forward links 118 and 124, the transmitting antennas of base station 102 can utilize beamforming to improve signal-to-noise ratio of forward links 118 and 124 for UE 116 and UE 122. Also, while base station 102 utilizes beamforming to transmit to UE 116 and UE 122 scattered randomly through an associated coverage, UEs in neighboring cells can be subject to less interference as compared to a base station transmitting through a single antenna to all its UEs.

Base station 102 can be associated with one or more cells. For instance, base station 102 can host, control, etc. the one or more cells. Further, a size of an area served by a cell associated with base station 102 can depend on factors such as, for example, morphology of the area, geographic distribution of UEs (e.g., UE 116, UE 122, . . . ), size of coverage areas of surrounding cells, and so forth.

A cell size parameter (e.g., cell type parameter, . . . ) can represent a size of an area served by a cell associated with base station 102. Base station 102 can automatically configure the cell size parameter for the one or more cells associated therewith. Thus, a network operator need not configure the cell size parameter for cell(s) hosted, controlled, etc. by base station 102, which can mitigate time spent by the network operator in connection with cell size parameter configuration, errors introduced by network operator intervention, and the like.

The cell size parameter can have an enumerated set of possible values. For example, the enumerated set of possible values can include four possible values. Following this example, the four possible values for the cell size parameter in the enumerated set can include very small, small, medium and large. By way of another example, the four possible values for the cell size parameter in the enumerated set can include femto, pico, micro, and macro. While many of the examples described herein relate to the enumerated set including four possible values for the cell size parameter, it is to be appreciated that an enumerated set that includes substantially any number of possible values for the cell size parameter is intended to fall within the scope of the hereto appended claims.

Figure 2:
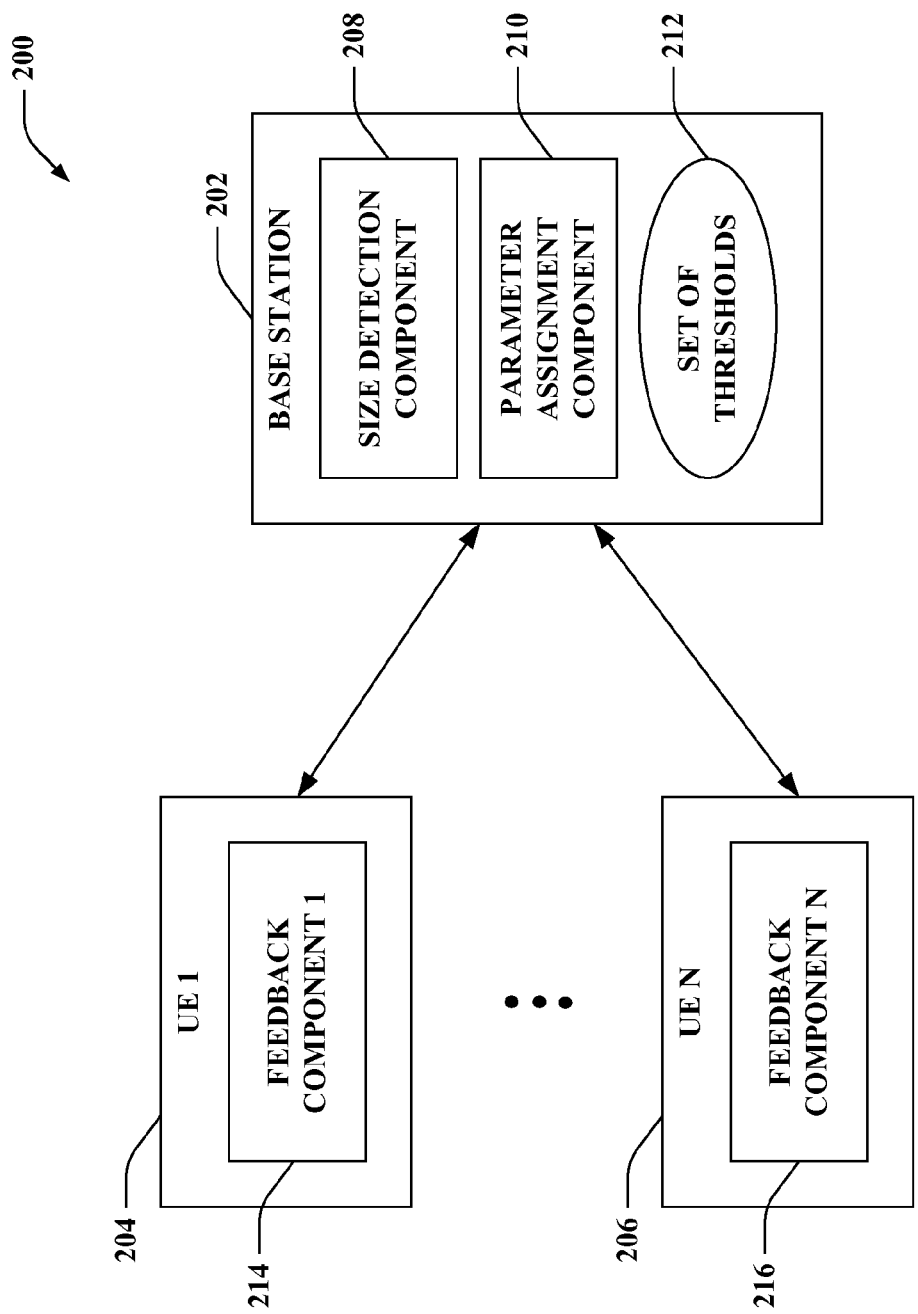
FIG. 2 is an illustration of an example system that automatically configures a cell size parameter in a wireless communication environment.

Now referring to FIG. 2, illustrated is a system 200 that automatically configures a cell size parameter in a wireless communication environment. System 200 includes a base station 202 that can transmit and/or receive information, signals, data, instructions, commands, bits, symbols, and the like. Base station 202 can communicate with substantially any number of user equipments (UEs) via the forward link and/or reverse link. For example, base station 202 can communicate with a UE 1 204, . . . , and a UE N 206 via the forward link and/or reverse link, where N can be substantially any integer. The UEs (e.g., UE 1 204, . . . , UE N 206, . . . ) can transmit and/or receive information, signals, data, instructions, commands, bits, symbols, and the like. Moreover, although not shown, it is contemplated that any number of base stations similar to base station 202 can be included in system 200.

Base station 202 can include a size detection component 208 and a parameter assignment component 210. Size detection component 208 can detect a size of an area served by a cell associated with base station 202. Size detection component 208 can detect the size of the area served by the cell automatically (e.g., without user action, without action by a network operator, . . . ) at base station 202. For example, size detection component 208 can determine the size of the area served by the cell as a function of location information obtained from UE(s) served by the cell (e.g., UE 1 204, . . . , and UE N 206, . . . ). According to another example, size detection component 208 can recognize the size of the area served by the cell as a function of path loss between base station 202 and UE(s) served by the cell (e.g., UE 1 204, . . . , and UE N 206, . . . ). Pursuant to yet a further example, size detection component 208 can identify the size of the area served by the cell as a function of a transmit power level for a reference signal sent by base station 202. Moreover, it is contemplated that a combination of the aforementioned examples can be employed by size detection component 208 in connection with detecting the size of the area served by the cell associated with base station 202. It is to be appreciated, however, that other techniques for detecting the size of the area served by the cell associated with base station 202 is intended to fall within the scope of the hereto appended claims.

Further, parameter assignment component 210 can assign a value of a network configuration parameter to the cell associated with base station 202. According to an example, the network configuration parameter can be a cell size parameter (e.g., as provided in an S1 application protocol (S1-AP), an X2 application protocol (X2-AP), . . . ). For instance, parameter assignment component 210 can automatically (e.g., without user action, without action by a network operator, . . . ) configure the value of the cell size parameter for the cell, thereby mitigating configuration of the value of the cell size parameter by a network operator. Parameter assignment component 210 can assign the value of the cell size parameter as a function of a comparison between the size of the area served by the cell as identified by size detection component 208 and a set of thresholds 212.

While many of the examples described herein relate to size detection component 208 detecting the size of the area served by a given cell associated with base station 202 and parameter assignment component 210 assigning the value of the cell size parameter for the given cell, it is contemplated that base station 202 can be associated with more than one cell. Accordingly, size detection component 208 can detect respective sizes of areas served by more than one cell associated with base station 202, and parameter assignment component 210 can assign respective values for the cell size parameter for the more than one cell. Yet, it is to be appreciated that the claimed subject matter is not so limited.

Parameter assignment component 210 can use set of thresholds 212 against the size of the served area to assign the value for the cell size parameter. According to an illustration, set of thresholds 212 can include at least three thresholds: a first threshold (T1), a second threshold (T2), and a third threshold (T3). For example, within set of thresholds 212, the second threshold can be greater than the first threshold, and the third threshold can be greater than the second threshold. Further, the cell size parameter can have an enumerated set of possible values including very small, small, medium and large. Following the above example, parameter assignment component 210 can automatically assign the value of the cell size parameter as very small when the size of the area served by the cell is less than or equal to the first threshold. Further, parameter assignment component 210 can automatically assign the value of the cell size parameter as small when the size of the area served by the cell is greater than the first threshold and the size of the area served by the cell is less than or equal to the second threshold. Moreover, parameter assignment component 210 can automatically assign the value of the cell size parameter as medium when the size of the area served by the cell is greater than the second threshold and the size of the area served by the cell is less than or equal to the third threshold. Further, parameter assignment component 210 can automatically assign the value of the cell size parameter as large when the size of the area served by the cell is greater than the third threshold. It is to be appreciated, however, that set of thresholds 212 can include more than three thresholds, different possible values (e.g., femto, pico, micro, macro, . . . ) for the cell size parameter can be included in the enumerated set, a differing number of possible values for the cell size parameter can be included in the enumerated set, and so forth.

Set of thresholds 212 can be configurable by a network operator, for instance. Moreover, the network operator can supply thresholds in set of thresholds 212 as configured to base station 202; thus, base station 202 can receive information indicating set of thresholds 212. The network operator can configure and supply thresholds for base station 202 individually (e.g., a respective set of thresholds can be uniquely configured for each base station in the network, . . . ) or for a group of base stations (e.g., the group can include base station 202, . . . ). By way of example, disparate base stations in addition to base station 202 can also employ set of thresholds 212 as configured and supplied by the network operator. Thus, the network operator can configure and supply set of thresholds 212, which can be used by base stations (e.g., base station 202, disparate base stations, . . . ) throughout the network, rather than assigning a value of a cell size parameter for each cell in the network (e.g., the network operator can configure one set of thresholds for the network, . . . ). It is contemplated that set of thresholds 212 can be predefined by the network operator, statically configured by the network operator, dynamically updated by the network operator, and so forth.

Although not shown, it is contemplated that set of thresholds 212 can be retained in memory of base station 202. Memory can store set of thresholds 212, data to be transmitted, received data, and any other suitable information related to performing the various actions and functions set forth herein.

Further, UE 1 204, . . . , and UE N 206 can respectively include a feedback component 1 214, . . . , and a feedback component N 216 (e.g., UE 1 204 can include feedback component 1 214, . . . , UE N 206 can include feedback component N 216, . . . ). Feedback component 1 214 can perform measurements for UE 1 204. Moreover, feedback component 1 214 can report the measurements to base station 202. For example, feedback component 1 214 can identify a location of UE 1 204, and can transmit location information that specifies the location of UE 1 204 to base station 202. By way of another example, feedback component 1 214 can monitor a receive power level of a reference signal sent by base station 202; the receive power level can be reported by feedback component 1 214 to base station 202. Other respective feedback components (e.g., feedback component N 216 of UE N 206, . . . ) can similarly perform and report measurements to base station 202.

According to an example, location information, receive power level of a reference signal, a combination thereof, and the like can be reported to base station 202 (e.g., by feedback component 1 214 of UE 1 204, . . . , feedback component N 216 of UE N 206, . . . ) in a measurement report message (MRM). Sending of the MRM can be triggered during a handover procedure, can be periodic, or the like. However, it is to be appreciated that the claimed subject matter is not limited to use of a MRM for reporting such information to base station 202.

Figure 3:
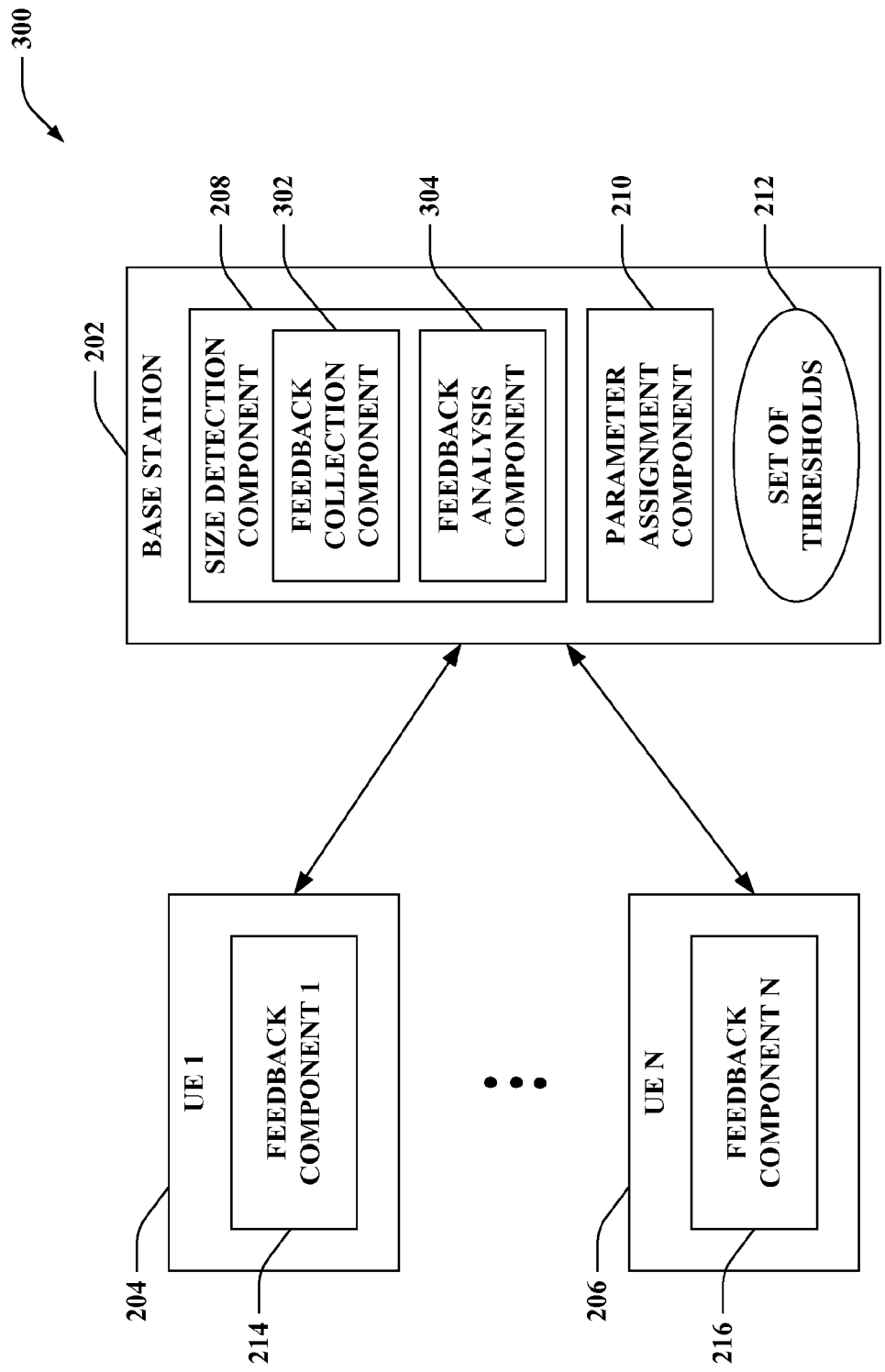
FIG. 3 is an illustration of an example system that evaluates size of an area served by a cell in a wireless communication environment.

Now referring to FIG. 3, illustrated is a system 300 that evaluates size of an area served by a cell in a wireless communication environment. System 300 includes base station 202, UE 1 204, . . . , and UE N 206. Base station 202 can further include size detection component 208, parameter assignment component 210, and set of thresholds 212. Further, UEs can further include respective feedback components (e.g., UE 1 204 can include feedback component 1 214, . . . , UE N 206 can include feedback component N 216, . . . ).

Size detection component 208 can automatically detect a size of an area served by a cell associated with base station 202. Size detection component 208 can determine the size of an area served by the cell associated with base station 202 based upon location information of one or more UEs (e.g., UE 1 204, . . . , UE N 206, . . . ) served by the cell, path loss between base station 202 and one or more UEs (e.g., UE 1 204, . . . , UE N 206, . . . ) served by the cell, transmit power level of a reference signal sent by base station 202, a combination thereof, and so forth. Further, parameter assignment component 210 can automatically assign a value of a cell size parameter based upon the size of the area served by the cell as detected by size detection component 208.

According to an example, size detection component 208 can detect the size of the area served by the cell associated with base station 202 as a function of a transmit power level of a reference signal transmitted by base station 202. Thus, the transmit power level of the reference signal can represent the size of the area served by the cell. For instance, a network operator, other logic, etc. can configure the transmit power level for the reference signal sent by base station 202 (e.g., for the cell, . . . ).

Size detection component 208 can utilize the transmit power level of the reference signal as representing the size of the area served by the cell. By way of example, set of thresholds 212 can include three transmit power level thresholds: 500 milliwatts (e.g., first threshold, T1, . . . ), 1 watt (e.g., second threshold, T2, . . . ), and 2 watts (e.g., third threshold, T3, . . . ). Following this example, size detection component 208 can recognize the transmit power level of the reference signal sent by base station 202, and the transmit power level can correlate with the size of the area served by the cell. Further, parameter assignment component 210 can compare the transmit power level of the reference signal to the three transmit power level thresholds (e.g., 500 milliwatts, 1 watt, and 2 watts, . . . ). If the transmit power level of the reference signal is less than or equal to 500 milliwatts, then parameter assignment component 210 can configure the value of the cell size parameter as very small (or femto). If the transmit power level of the reference signal is greater than 500 milliwatts, but less than or equal to 1 watt, then parameter assignment component 210 can configure the value of the cell size parameter as small (or pico). If the transmit power level of the reference signal is greater than 1 watt, but less than or equal to 2 watts, then parameter assignment component 210 can configure the value of the cell size parameter as medium (or micro). If the transmit power level of the reference signal is greater than 2 watts, then parameter assignment component 210 can configure the value of the cell size parameter as large (or macro). It is to be appreciated, however, that the claimed subject matter is not limited to the foregoing example, as any transmit power level thresholds are intended to fall within the scope of the hereto appended claims.

Size detection component 208 can further include a feedback collection component 302 and a feedback analysis component 304. Feedback collection component 302 can receive feedback reported by one or more UEs (e.g., UE 1 204, ..., UE N 206, ...) served by the cell. For instance, feedback collection component 302 can receive MRMs from the one or more UEs; however, the claimed subject matter is not so limited. Moreover, feedback analysis component 304 can evaluate the feedback, compute a statistic based upon the feedback, and so forth. Further, parameter assignment component 210 can configure the value of the cell size parameter as a function of the statistic yielded by feedback analysis component 304.

By way of an example, size detection component 208 can detect the size of the area served by the cell associated with base station 202 as a function of location information of the one or more UEs (e.g., UE 1 204, ..., UE N 206, ...) served by the cell. Following this example, feedback collection component 302 can receive the location information from the one or more UEs (e.g., reported by respective feedback component(s) such as feedback component 1 214, ..., feedback component N 216, ...) served by the cell. For instance, the location information can be reported in MRMs obtained from the one or more UEs; however, the claimed subject matter is not so limited. Moreover, feedback analysis component 304 can compute a set of distances from base station 202 to the one or more UEs based upon the location information. By way of illustration, feedback analysis component 304 can evaluate a distance from a cell transmitter (e.g., associated with base station 202, ...) to each of the one or more UEs that report the location information while served by the cell. Moreover, feedback analysis component 304 can compute a statistic based upon the set of distances. Further, the size of the area served by the cell can be detected by size detection component 208 as a function of the statistic yielded from the set of distances by feedback analysis component 304.

It is contemplated that any statistic based upon the set of distances can be evaluated by feedback analysis component 304. For example, feedback analysis component 304 can recognize a maximum distance, a minimum distance, a mean distance, a median distance, an Rth largest distance (where R can be substantially any integer), S standard deviations from a mean distance (where S can be substantially any real number (and/or substantially any integer)), and so forth. Size detection component 208 can recognize the size of the area served by the cell based upon a statistical distance (e.g., the statistic, ...) yielded from the set of distances (e.g., the statistical distance can represent the size of the area served by the cell, ...), and parameter assignment component 210 can assign the value of the cell size parameter based upon the statistical distance and set of thresholds 212.

According to an example, set of thresholds 212 can include three distance thresholds: 100 meters (e.g., first threshold, T1, ...), 500 meters (e.g., second threshold, T2, ...), and 1 kilometer (e.g., third threshold, T3, ...). Following this example, the statistical distance generated from the set of distances can correlate with the size of the area served by the cell. Further, parameter assignment component 210 can compare the statistical distance generated from the set of distances to the three distance thresholds (e.g., 100 meters, 500 meters, 1 kilometer, ...). If the statistical distance is less than or equal to 100 meters, then parameter assignment component 210 can configure the value of the cell size parameter as very small (or femto). If the statistical distance is greater than 100 meters, but less than or equal to 500 meters, then parameter assignment component 210 can configure the value of the cell size parameter as small (or pico). If the statistical distance is greater than 500 meters, but less than or equal to 1 kilometer, then parameter assignment component 210 can configure the value of the cell size parameter as medium (or micro). If the statistical distance is greater than 1 kilometer, then parameter assignment component 210 can configure the value of the cell size parameter as larger (or macro). It is to be appreciated, however, that the claimed subject matter is not limited to the foregoing example, as any distance thresholds are intended to fall within the scope of the hereto appended claims.

In accordance with another example, size detection component 208 can detect the size of the area served by the cell associated with base station 202 as a function of path loss between base station 202 and the one or more UEs (e.g., UE 1 204, ..., UE N 206, ...) served by the cell. Following this example, feedback collection component 302 can receive information specifying receive power levels of a reference signal from the one or more UEs (e.g., reported by respective feedback component(s) such as feedback component 1 214, ..., feedback component N 216, ...) served by the cell. For instance, the information specifying the receive power levels of the reference signal can be reported in MRMs obtained from the one or more UEs; however, the claimed subject matter is not so limited. Moreover, feedback analysis component 304 can compute a set of path losses from base station 202 to the one or more UEs based upon the receive power levels of the reference signal. By way of illustration, feedback analysis component 304 can evaluate a path loss between base station 202 and a particular UE (e.g., UE 1 204, ..., UE N 206, ...) by comparing a transmit power level of the reference signal (e.g., sent by base station 202, ...) to the receive power level of the reference signal (e.g., as reported by the particular UE, ...). Moreover, feedback analysis component 304 can compute a statistic based upon the set of path losses. Further, the size of the area served by the cell can be detected by size detection component 208 as a function of the statistic yielded from the set of path losses by feedback analysis component 304. While many of the examples described herein relate to use of a reference signal (e.g., in Long Term Evolution (LTE), ...), it is contemplated that these examples can be extended to a Common Pilot Channel (e.g., in Universal Mobile Telecommunication System (UMTS), ...) or a Broadcast Control Channel (e.g., in Global System for Mobile Communications (GSM), ...).

It is contemplated that any statistic based upon the set of path losses can be evaluated by feedback analysis component 304. For example, feedback analysis component 304 can recognize a maximum path loss, a minimum path loss, a mean path loss, a median path loss, a Tth largest path loss (where T can be substantially any integer), U standard deviations from a mean path loss (where U can be substantially any real number (and/or substantially any integer)), and so forth. Size detection component 208 can recognize the size of the area served by the cell based upon a statistical path loss (e.g., the statistic, ...) yielded from the set of path losses (e.g., the statistical path loss can represent the size of the area served by the cell, ...), and parameter assignment component 210 can assign the value of the cell size parameter based upon the statistical path loss and set of thresholds 212.

According to an example, set of thresholds 212 can include three path loss thresholds: 110 decibels (e.g., first threshold, T1, ...), 130 decibels (e.g., second threshold, T2, ...), and 150 decibels (e.g., third threshold, T3, ...). Following this example, the statistical path loss generated from the set of path losses can correlate with the size of the area served by the cell. Further, parameter assignment component 210 can compare the statistical path loss generated from the set of path losses to the three path loss thresholds (e.g., 110 decibels, 130 decibels, 150 decibels, . . . ). If the statistical path loss is less than or equal to 110 decibels, then parameter assignment component 210 can configure the value of the cell size parameter as very small (or femto). If the statistical path loss is greater than 110 decibels, but less than or equal to 130 decibels, then parameter assignment component 210 can configure the value of the cell size parameter as small (or pico). If the statistical path loss is greater than 130 decibels, but less than or equal to 150 decibels, then parameter assignment component 210 can configure the value of the cell size parameter as medium (or micro). If the statistical path loss is greater than 150 decibels, then parameter assignment component 210 can configure the value of the cell size parameter as larger (or macro). It is to be appreciated, however, that the claimed subject matter is not limited to the foregoing example, as any path loss thresholds are intended to fall within the scope of the hereto appended claims.

Figure 4:
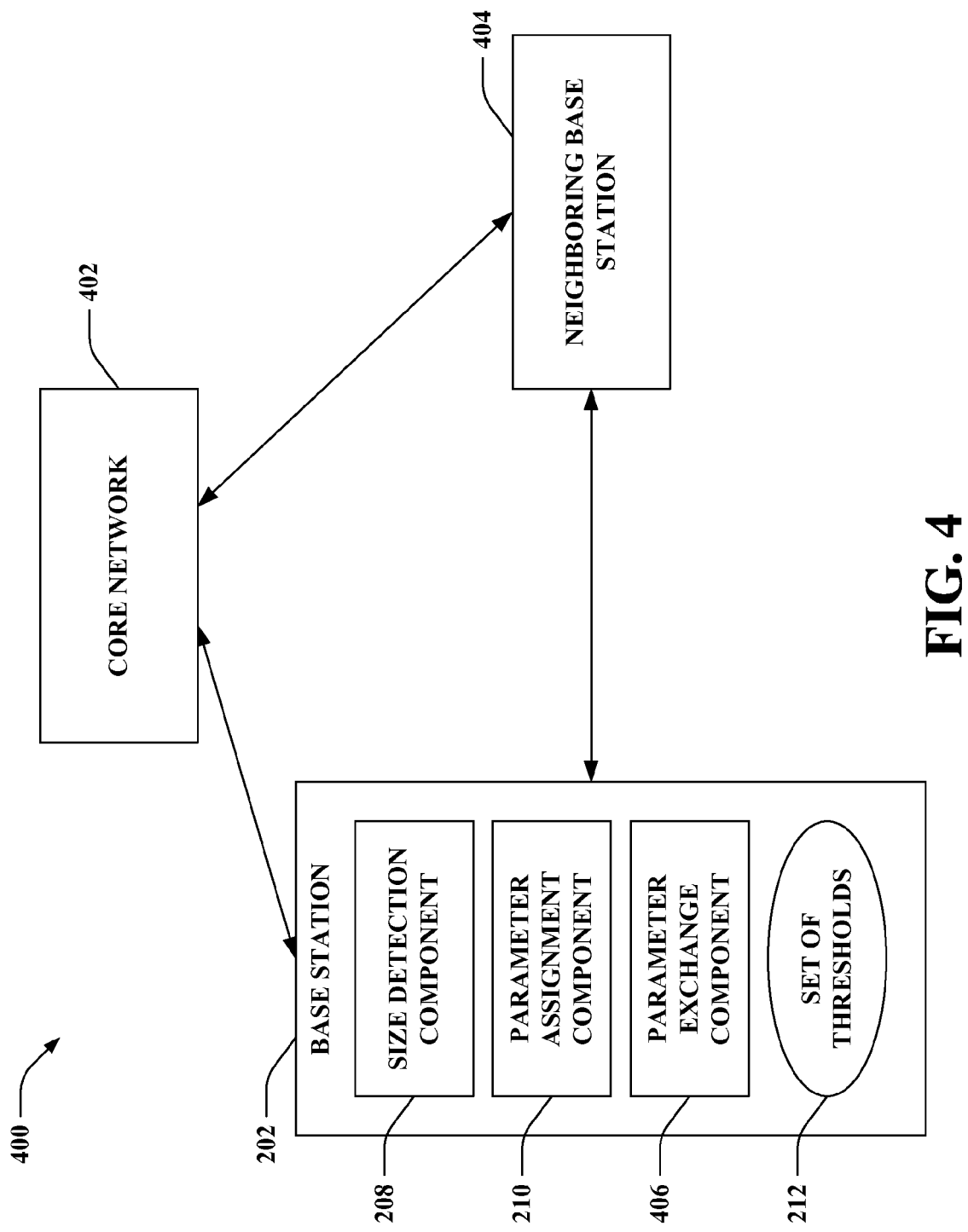
FIG. 4 is an illustration of an example system that exchanges a cell size parameter value between base stations in a wireless communication environment.

Turning to FIG. 4, illustrated is a system 400 that exchanges a cell size parameter value between base stations in a wireless communication environment. System 400 includes base station 202, a core network 402 and a neighboring base station 404. Although not shown, it is contemplated that system 400 can include any number of disparate base stations in addition to base station 202 and neighboring base station 404.

Base station 202 can further include size detection component 208, parameter assignment component 210, and set of thresholds 212. Size detection component 208 can detect a size of an area served by a cell associated with base station 202. Further, parameter assignment component 210 can assign a value of a cell size parameter based upon the size of the area served by the cell as detected by size detection component 208 and set of thresholds 212. Moreover, base station 202 can include a parameter exchange component 406 that can signal the value of the cell size parameter (e.g., configured by parameter assignment component 210, . . . ) from base station 202 to neighboring base station 404. The cell size parameter can be part of an information element (IE) such as a last visited cell information IE; yet, the claimed subject matter is not so limited. Further, parameter exchange component 406 can receive information indicating a value of a cell size parameter for a cell associated with (e.g., controlled by, hosted by, . . . ) neighboring base station 404.

According to an example, parameter exchange component 406 can signal the value of the cell size parameter from base station 202 to neighboring base station 404 via an X2 interface. Following this example, the value of the cell size parameter can be exchanged by parameter exchange component 406 between base station 202 and neighboring base station 404 using an X2 application protocol (X2-AP). For instance, the value of the cell size parameter can be exchanged using the X2-AP during exchange of UE history information, which can occur upon successful inter-base station handover. Yet, it is contemplated that the claimed subject matter is not limited to the foregoing example.

By way of another example, parameter exchange component 406 can send information indicating the value of the cell size parameter to core network 402 via an S1 interface. Core network 402 can thereafter relay the information indicating the value of the cell size parameter to neighboring base station 404. Pursuant to this example, the protocol utilized between base station 202 and core network 402 can be an S1 application protocol (S1-AP). It is to be appreciated, however, that the claimed subject matter is not limited to the aforementioned example.

Figure 5:
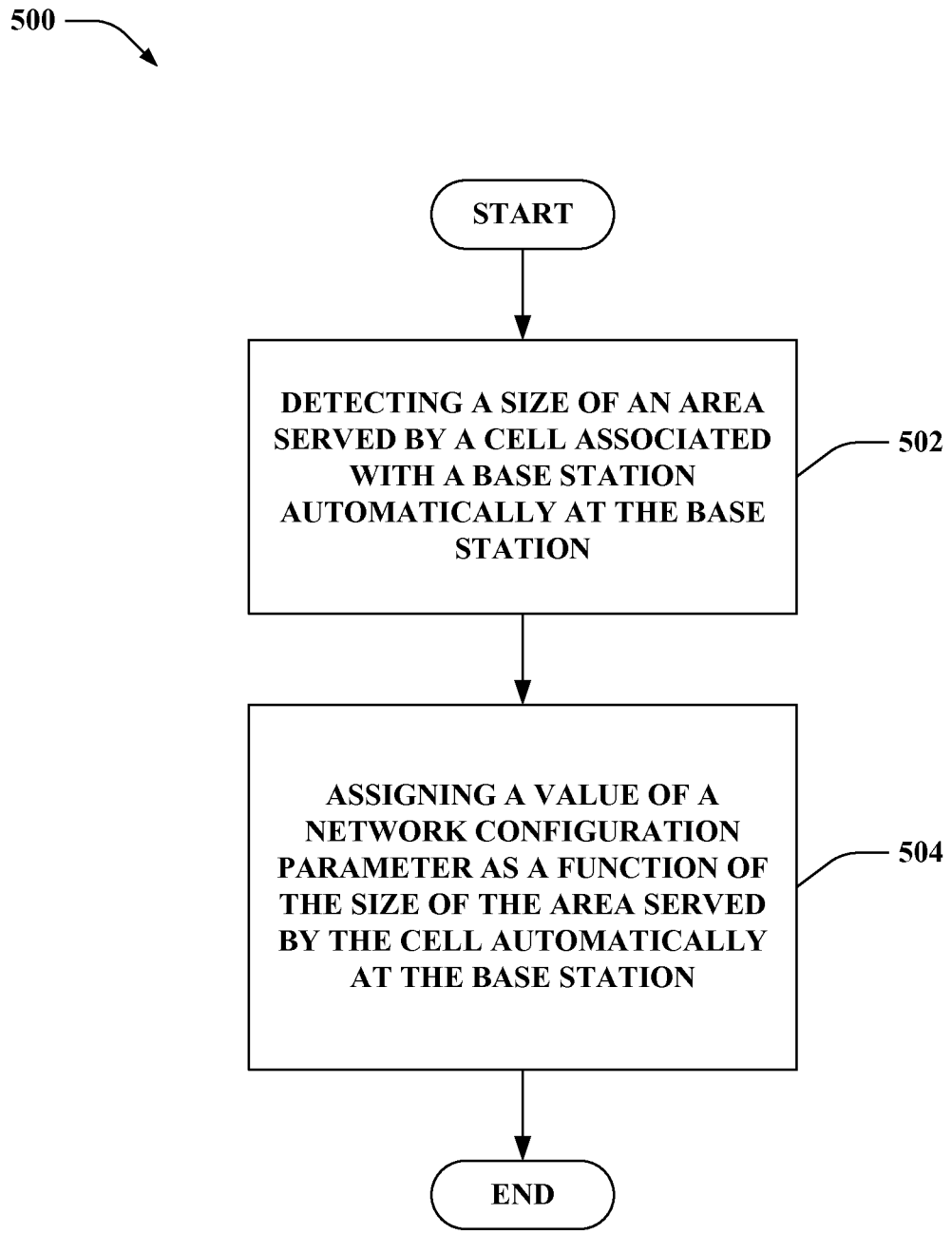
FIG. 5 is an illustration of an example methodology that facilitates automatic network configuration in a wireless communication environment.
Figure 6:
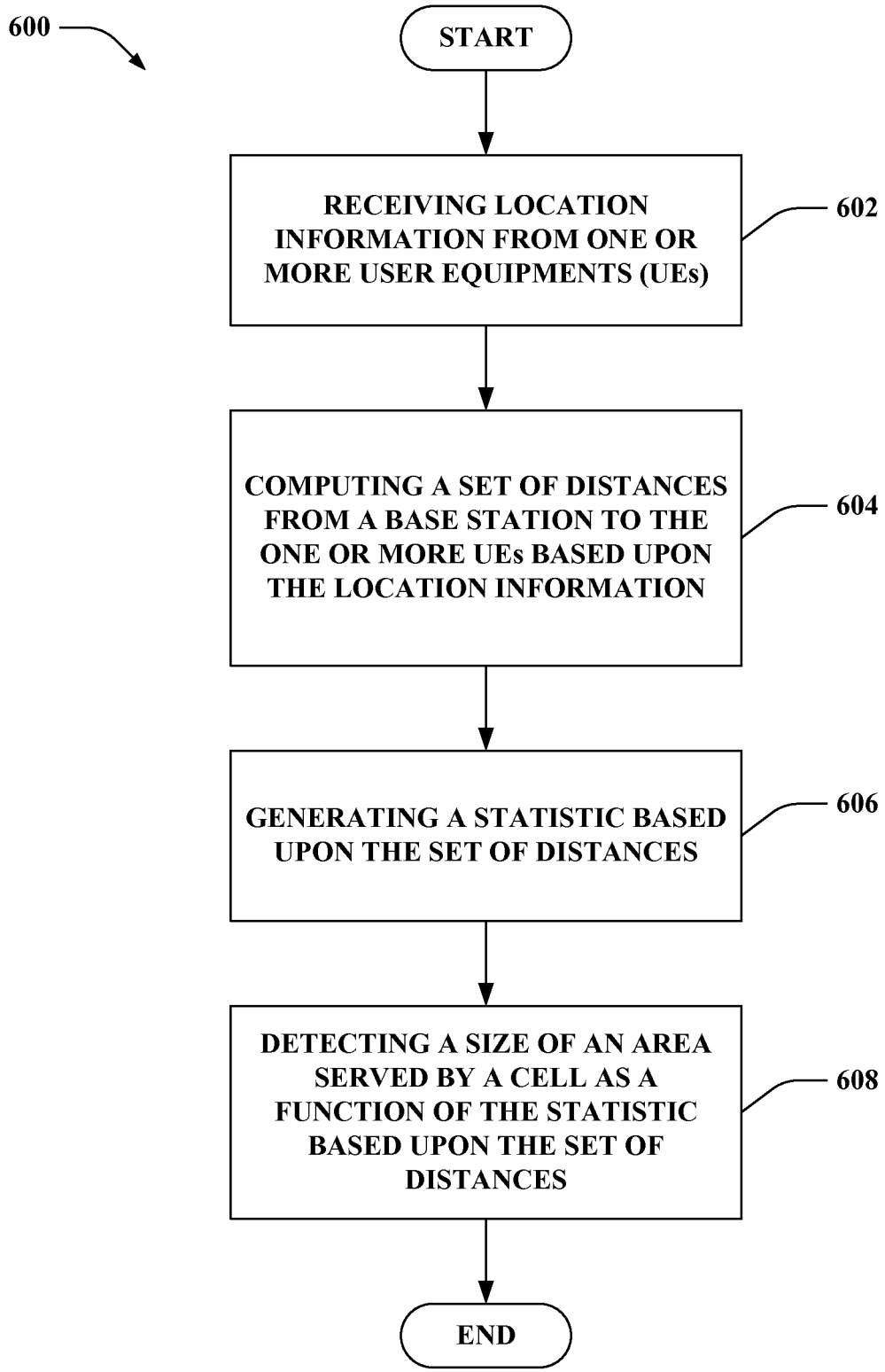
FIG. 6 is an illustration of an example methodology that facilitates detecting a size of an area served by a cell as a function of location information in a wireless communication environment.
Figure 7:
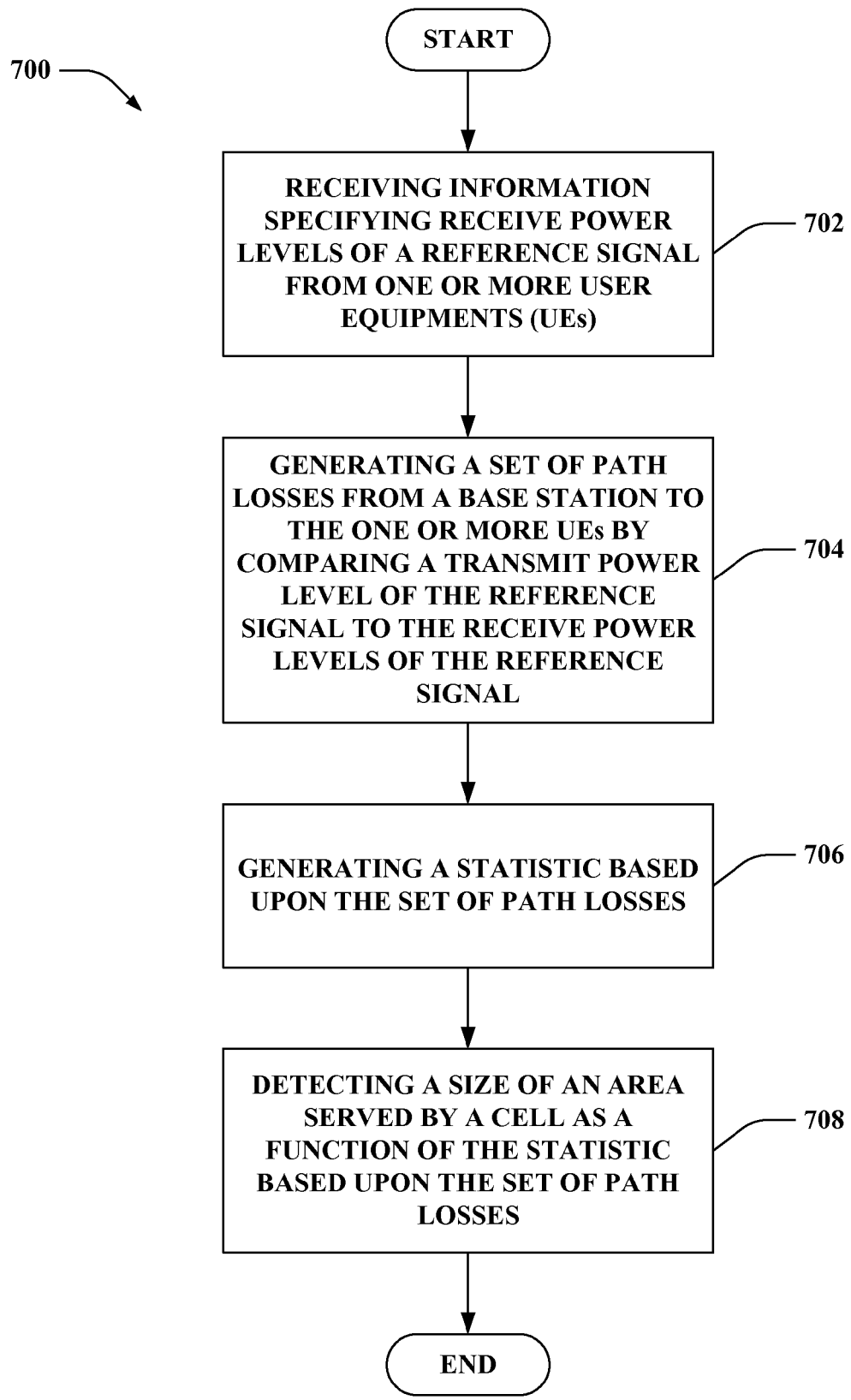
FIG. 7 is an illustration of an example methodology that facilitates detecting a size of an area served by a cell as a function of a path loss in a wireless communication environment.

Referring to FIGS. 5-7, methodologies relating to automatic configuration of a network configuration parameter in a wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 5, illustrated is a methodology 500 that facilitates automatic network configuration in a wireless communication environment. At 502, a size of an area served by a cell associated with a base station can be detected automatically at the base station. For instance, the base station can control, host, etc. the cell. Moreover, it is contemplated that the base station can be associated with more than one cell; yet, the claimed subject matter is not so limited. According to an example, the size of the area served by the cell can be detected as a function of location information of one or more UEs served by the cell. According to another example, the size of the area served by the cell can be detected as a function of path loss between the base station and one or more UEs served by the cell. By way of yet a further example, the size of the area served by the cell can be detected as a function of a transmit power level of a reference signal sent by the base station. Moreover, it is contemplated that the size of the area served by the cell can be detected as a function of two or more of location information of one or more UEs served by the cell, a path loss between the base station and the one or more UEs served by the cell, or a transmit power level of a reference signal sent by the base station.

At 504, a value of a network configuration parameter can be assigned (e.g., configured, . . . ) as a function of the size of the area served by the cell automatically at the base station. For instance, the value of the network configuration parameter can be assigned by comparing the size of the area served by the cell against a set of thresholds. Further, the network configuration parameter can be a cell size parameter. For instance, the value of the cell size parameter can be assigned automatically as being one of very small, small, medium, or large (e.g., an enumerated set of possible values of the cell size parameter can include very small, small, medium, and large, . . . ). By way of another illustration, the value of the cell size parameter can be assigned automatically as being one of femto, pico, micro, or macro (e.g., an enumerated set of possible values of the cell size parameter can include femto, pico, micro, and macro, . . . ).

According to an example, the set of thresholds can include a first threshold, a second threshold greater than the first threshold, and a third threshold greater than the second threshold. Following this example, the value of the cell size parameter can be automatically assigned as very small (or femto) when the size of the area served by the cell is less than or equal to the first threshold. Further, the value of the cell size parameter can be automatically assigned as small (or pico) when the size of the area served by the cell is greater than the first threshold and the size of the area served by the cell is less than or equal to the second threshold. Moreover, the value of the cell size parameter can be automatically assigned as medium (or micro) when the size of the area served by the cell is greater than the second threshold and the size of the area served by the cell is less than or equal to the third threshold. Further, the value of the cell size parameter can be automatically assigned as large (or macro) when the size of the area served by the cell is greater than the third threshold.

By way of another example, information indicating the set of thresholds can be received. For instance, the set of thresholds can be configurable by a network operator. Upon being configured by the network operator, the set of thresholds can be supplied by the network operator. By way of illustration, the set of thresholds can be configured by the network operator for use by base stations across a network; yet, the claimed subject matter is not so limited.

Pursuant to another example, the value of the cell size parameter can be signaled from the base station to a neighboring base station. For instance, the value of the cell size parameter can be signaled from the base station to the neighboring base station using an X2 application protocol (X2-AP). According to a further illustration, the value of the cell size parameter can be signaled from the base station to the neighboring base station via a core network using an S1 application protocol (S1-AP).

Turning to FIG. 6, illustrated is a methodology 600 that facilitates detecting a size of an area served by a cell as a function of location information in a wireless communication environment. At 602, location information can be received from one or more user equipments (UEs). For example, the location information can be reported in MRMs received from the one or more UEs. At 604, a set of distances from a base station to the one or more UEs can be computed based upon the location information. At 606, a statistic based upon the set of distances can be generated. By way of example, the statistic based upon the set of distances can be a maximum distance, a minimum distance, a mean distance, a median distance, an Rth largest distance (where R can be substantially any integer), S standard deviations from (e.g., above, below, . . . ) the mean distance (where S can be substantially any real number), a combination thereof, and so forth. At 608, a size of an area served by a cell (e.g., associated with a base station, hosted by the base station, controlled by the base station, . . . ) can be detected as a function of the statistic based upon the set of distances.

Now referring to FIG. 7, illustrated is a methodology 700 that facilitates detecting a size of an area served by a cell as a function of a path loss in a wireless communication environment. At 702, information specifying receive power levels of a reference signal can be received from one or more user equipments (UEs). For example, the information specifying the receive power levels of the reference signal can be reported in MRMs received from the one or more UEs. At 704, a set of path losses from a base station to the one or more UEs can be generated by comparing a transmit power level of the reference signal to the receive power levels of the reference signal. At 706, a statistic based upon the set of path losses can be generated. Pursuant to an example, the statistic based upon the set of paths losses can be a maximum path loss, a minimum path loss, a mean path loss, a median path loss, a Tth largest path loss (where T can be substantially any integer), U standard deviations from (e.g., above, below, . . . ) the mean path loss (where U can be substantially any real number), a combination thereof, and so forth. At 708, a size of an area served by a cell (e.g., associated with the base station, hosted by the base station, controlled by the base station, . . . ) can be detected as a function of the statistic based upon the set of path losses.

It will be appreciated that, in accordance with one or more aspects described herein, inferences can be made pertaining to configuring a cell size parameter in a wireless communication environment. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 8:
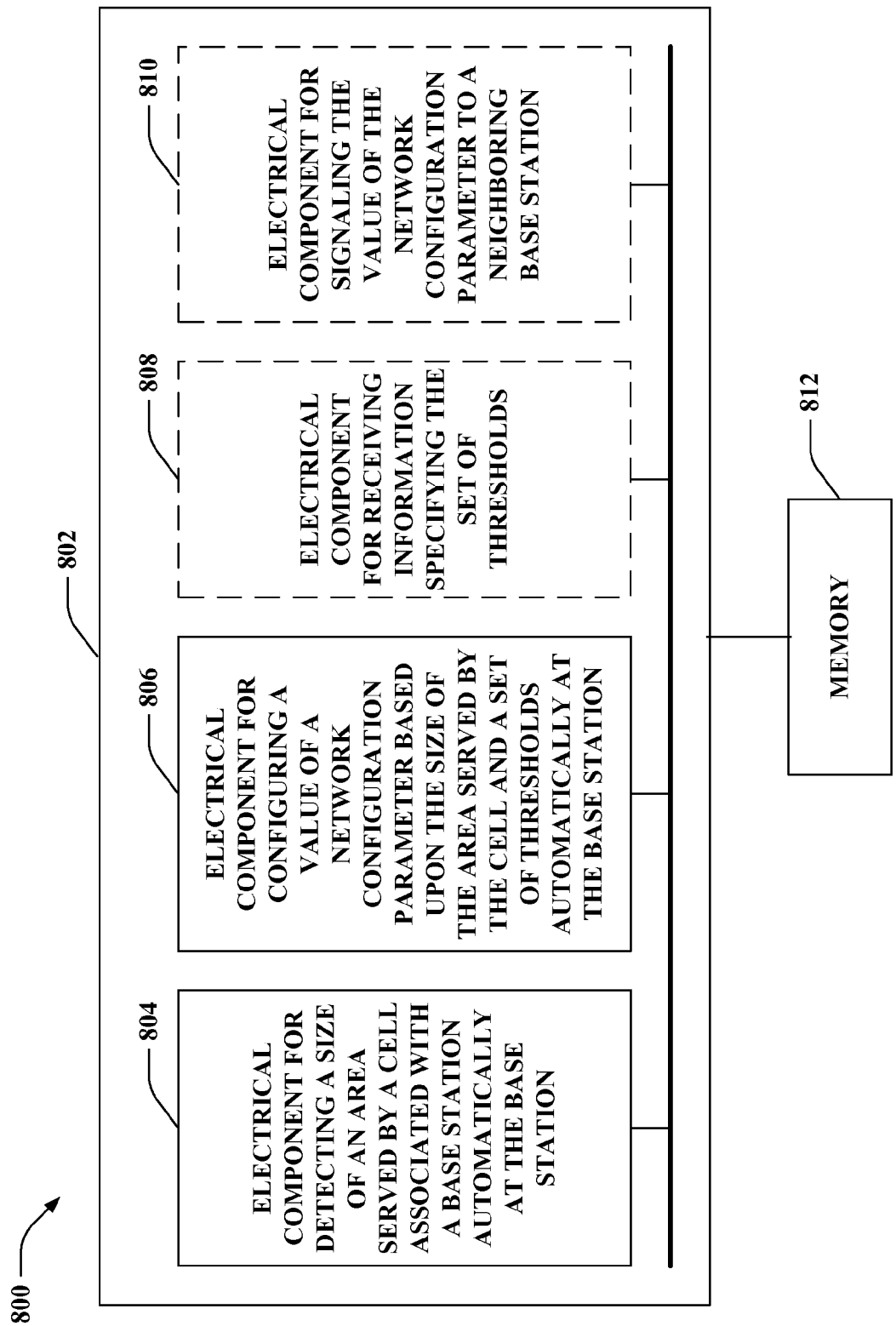
FIG. 8 is an illustration of an example system that enables automatically setting a parameter value in a wireless communication environment.

With reference to FIG. 8, illustrated is a system 800 that enables automatically setting a parameter value in a wireless communication environment. For example, system 800 can reside at least partially within a base station. It is to be appreciated that system 800 is represented as including functional blocks, which can be functional blocks that represent functions implemented by a processor, software, or combination thereof (e.g., firmware). System 800 includes a logical grouping 802 of electrical components that can act in conjunction. For instance, logical grouping 802 can include an electrical component for detecting a size of an area served by a cell associated with a base station automatically at the base station 804. Further, logical grouping 802 can include an electrical component for configuring a value of a network configuration parameter based upon the size of the area served by the cell and a set of thresholds automatically at the base station 806. For instance, the network configuration parameter can be a cell size parameter. Logical grouping 802 can also optionally include an electrical component for receiving information specifying the set of thresholds 808. Moreover, logical grouping 802 can optionally include an electrical component for signaling the value of the network configuration parameter to a neighboring base station 810. Additionally, system 800 can include a memory 812 that retains instructions for executing functions associated with electrical components 804, 806, 808, and 810. While shown as being external to memory 812, it is to be understood that one or more of electrical components 804, 806, 808, and 810 can exist within memory 812.

Figure 9:
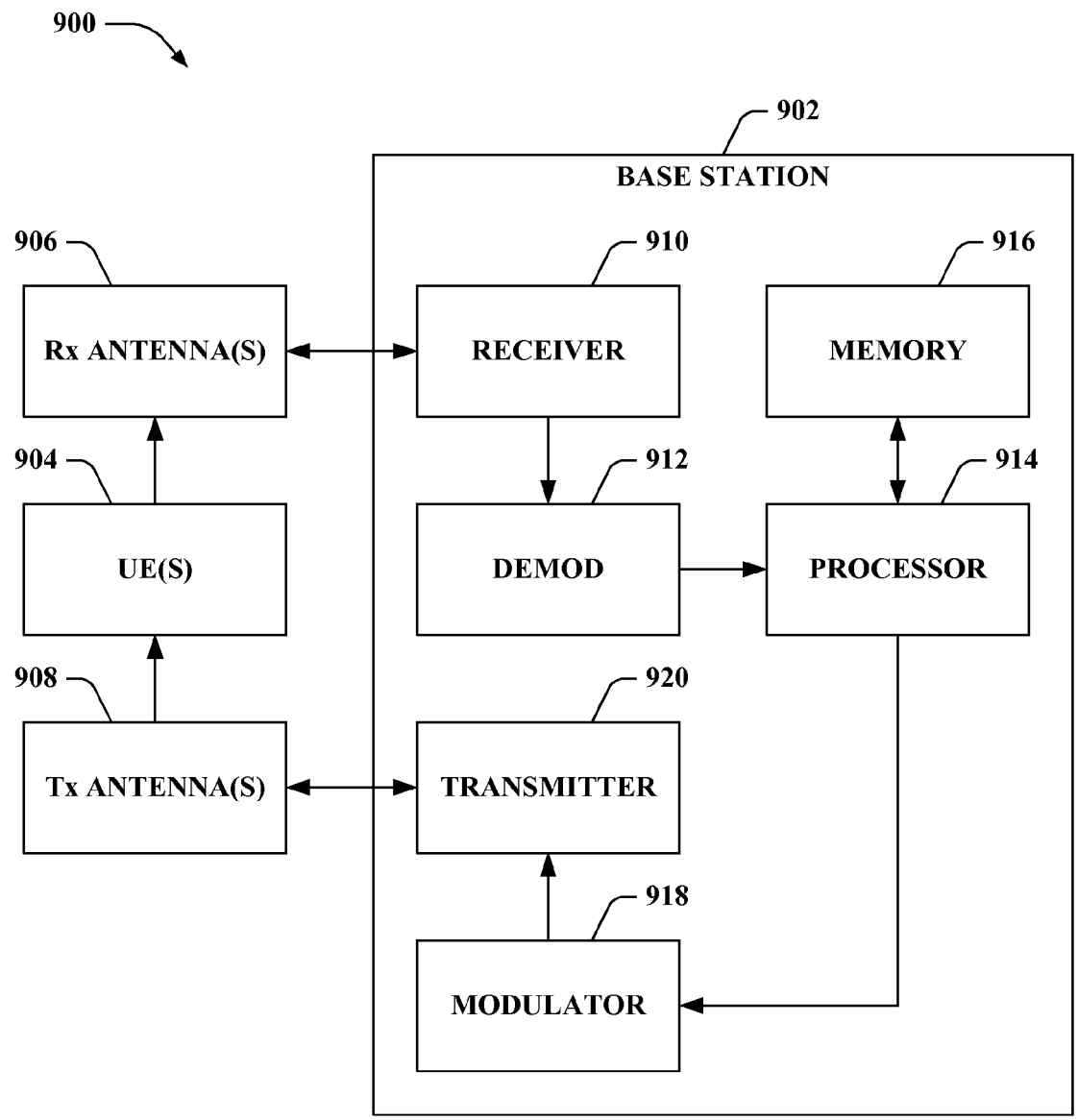
FIGS. 9-10 are illustrations of example systems that can be utilized to implement various aspects of the functionality described herein.

FIG. 9 is an illustration of a system 900 that can be utilized to implement various aspects of the functionality described herein. System 900 can include a base station 902 (e.g., base station 202, neighboring base station 404, . . . ). Base station 902 can receive signal(s) from one or more UEs 904 via one or more receive (Rx) antennas 906 and transmit to the one or more UEs 904 via one or more transmit (Tx) antennas 908. Further, base station 902 can include a receiver 910 that receives information from receive antenna(s) 906. According to an example, receiver 910 can be operatively associated with a demodulator (demod) 912 that demodulates received information. Demodulated symbols can be analyzed by a processor 914. Processor 914 can be coupled to memory 916, which can store data to be transmitted to or received from UE(s) 904 and/or any other suitable protocols, algorithms, information, etc. related to performing the various actions and functions set forth herein. For example, base station 902 can employ processor 914 to perform methodologies 500, 600, 700, and/or other similar and appropriate methodologies. Base station 902 can further include a modulator 918 that can multiplex a signal for transmission by a transmitter 920 through antenna(s) 908.

Processor 914 can be a processor dedicated to analyzing information received by receiver 910, dedicated to generating information for transmission by transmitter 920, or dedicated to controlling one or more components of base station 902. According to another example, processor 914 can analyze information received by receiver 910, generate information for transmission by transmitter 920, and control one or more components of base station 902. The one or more components of base station 902 can include, for example, size detection component 208, parameter assignment component 210, feedback collection component 302, feedback analysis component 304, and/or parameter exchange component 406. Moreover, although not shown, it is contemplated that the one or more components of base station 902 can be part of processor 914 or a plurality of processors (not shown).

Figure 10:
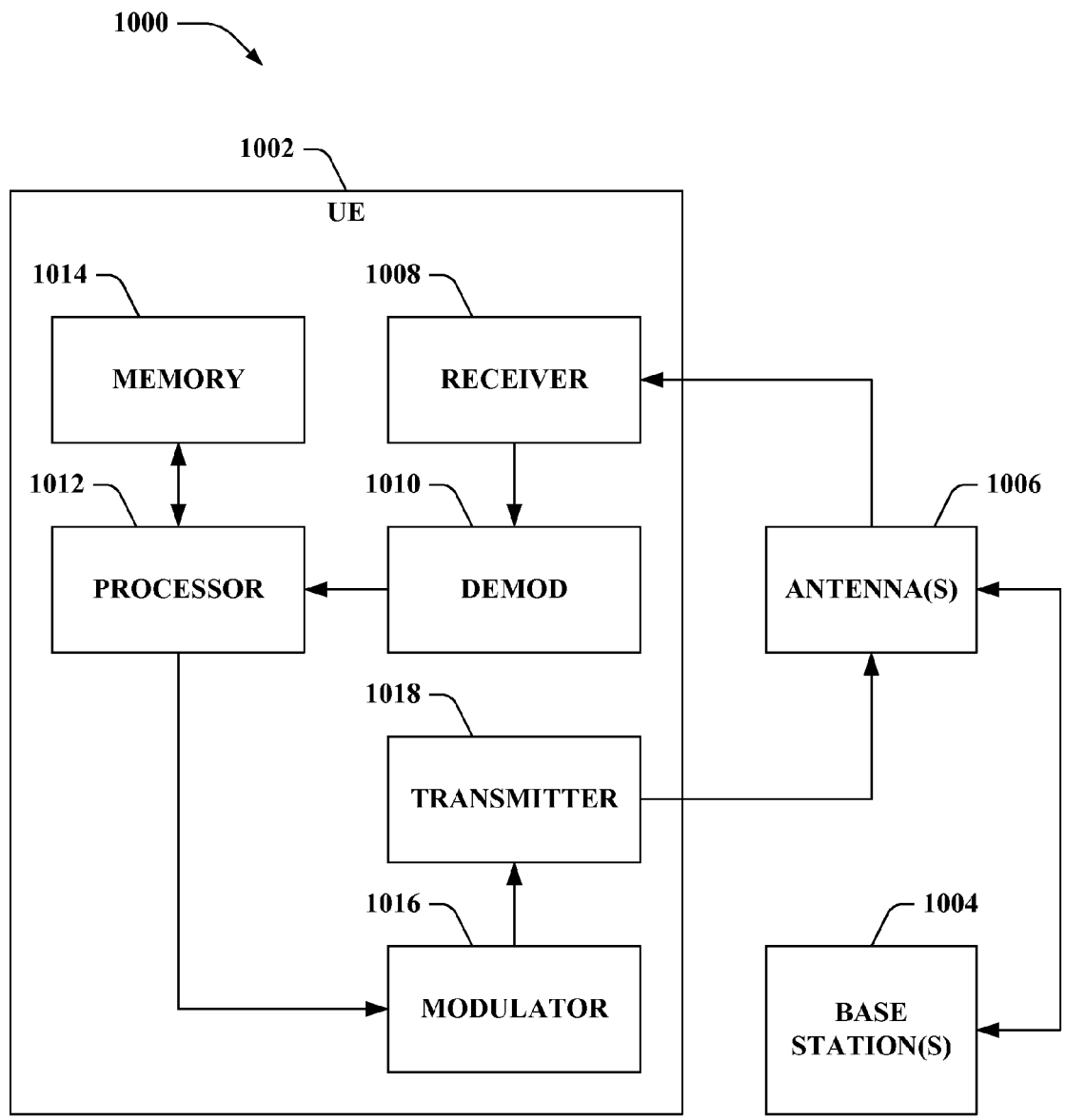

FIG. 10 is an illustration of a system 1000 that can be utilized to implement various aspects of the functionality described herein. System 1000 can include a UE 1002 (e.g., UE 1 204, ..., UE N 206, ...). UE 1002 can receive signal(s) from one or more base stations 1004 and/or transmit to one or more base stations 1004 via one or more antennas 1006. Further, UE 1002 can include a receiver 1008 that receives information from antenna(s) 1006. According to an example, receiver 1008 can be operatively associated with a demodulator (demod) 1010 that demodulates received information. Demodulated symbols can be analyzed by a processor 1012. Processor 1012 can be coupled to memory 1014, which can store data to be transmitted to or received from base station(s) 1004 and/or any other suitable protocols, algorithms, information, etc. related to performing the various actions and functions set forth herein. UE 1002 can further include a modulator 1016 that can multiplex a signal for transmission by a transmitter 1018 through antenna(s) 1006.

Processor 1012 can be a processor dedicated to analyzing information received by receiver 1008, dedicated to generating information for transmission by transmitter 1018, or dedicated to controlling one or more components of UE 1002. According to another example, processor 1012 can analyze information received by receiver 1008, generate information for transmission by transmitter 1018, and control one or more components of UE 1002. The one or more components of UE 1002 can include, for example, a feedback component (e.g., feedback component 1 214, ..., feedback component N 216, ...). Moreover, although not shown, it is contemplated that the one or more components of UE 1002 can be part of processor 1012 or a plurality of processors (not shown).

Figure 11:
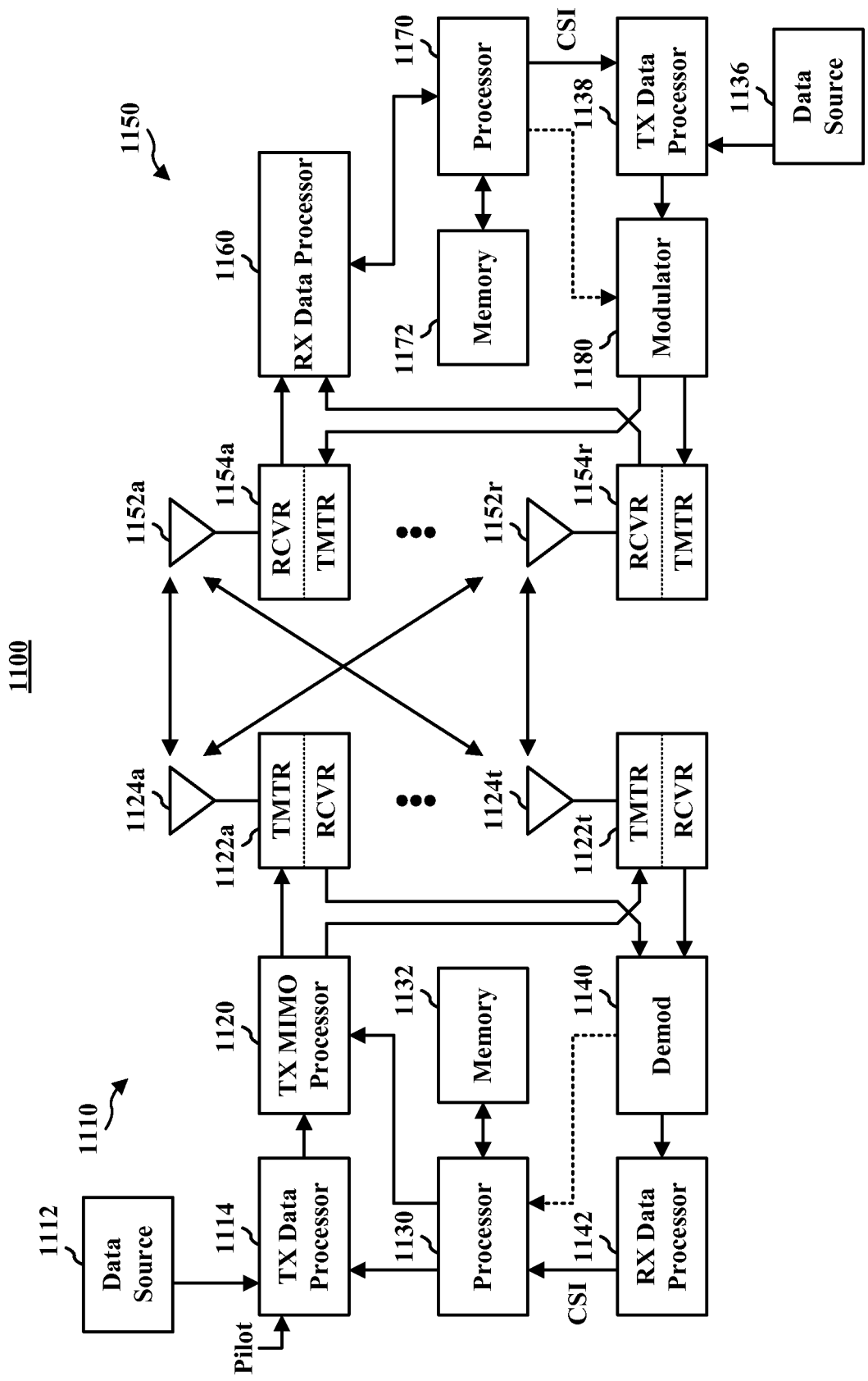
FIG. 11 is an illustration of an example wireless communication system that can be employed in conjunction with the various systems and methods described herein.

FIG. 11 shows an example wireless communication system 1100. Wireless communication system 1100 depicts one base station 1110 and one UE 1150 for sake of brevity. However, it is to be appreciated that system 1100 can include more than one base station and/or more than one UE, wherein additional base stations and/or UEs can be substantially similar or different from example base station 1110 and UE 1150 described below. In addition, it is to be appreciated that base station 1110 and/or UE 1150 can employ the systems (FIGS. 1-4, and 8-10) and/or methods (FIGS. 5-7) described herein to facilitate wireless communication there between.

At base station 1110, traffic data for a number of data streams is provided from a data source 1112 to a transmit (TX) data processor 1114. According to an example, each data stream can be transmitted over a respective antenna. TX data processor 1114 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at UE 1150 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1130.

The modulation symbols for the data streams can be provided to a TX MIMO processor 1120, which can further process the modulation symbols (e.g., for OFDM). TX MIMO processor 1120 then provides $N_T$ modulation symbol streams to $N_T$ transmitters (TMTR) 1122a through 1122t. In various embodiments, TX MIMO processor 1120 applies beamforming weights to the symbols of the data streams and to the antenna from which the symbol is being transmitted.

Each transmitter 1122 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1122a through 1122t are transmitted from $N_T$ antennas 1124a through 1124t, respectively.

At UE 1150, the transmitted modulated signals are received by $N_R$ antennas 1152a through 1152r and the received signal from each antenna 1152 is provided to a respective receiver (RCVR) 1154a through 1154r. Each receiver 1154 conditions (e.g., filters, amplifies, and downconverts) a respective signal, digitizes the conditioned signal to provide samples, and further processes the samples to provide a corresponding "received" symbol stream.

An RX data processor 1160 can receive and process the $N_R$ received symbol streams from $N_R$ receivers 1154 based on a particular receiver processing technique to provide $N_T$ "detected" symbol streams. RX data processor 1160 can demodulate, deinterleave, and decode each detected symbol stream to recover the traffic data for the data stream. The processing by RX data processor 1160 is complementary to that performed by TX MIMO processor 1120 and TX data processor 1114 at base station 1110.

A processor 1170 can periodically determine which available technology to utilize as discussed above. Further, processor 1170 can formulate a reverse link message comprising a matrix index portion and a rank value portion.

The reverse link message can comprise various types of information regarding the communication link and/or the received data stream. The reverse link message can be processed by a TX data processor 1138, which also receives traffic data for a number of data streams from a data source 1136, modulated by a modulator 1180, conditioned by transmitters 1154a through 1154r, and transmitted back to base station 1110.

At base station 1110, the modulated signals from UE 1150 are received by antennas 1124, conditioned by receivers 1122, demodulated by a demodulator 1140, and processed by a RX data processor 1142 to extract the reverse link message transmitted by UE 1150. Further, processor 1130 can process the extracted message to determine which precoding matrix to use for determining the beamforming weights.

Processors 1130 and 1170 can direct (e.g., control, coordinate, manage, etc.) operation at base station 1110 and UE 1150, respectively. Respective processors 1130 and 1170 can be associated with memory 1132 and 1172 that store program codes and data. Processors 1130 and 1170 can also perform computations to derive frequency and impulse response estimates for the uplink and downlink, respectively.

It is to be understood that the aspects described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates network configuration in a wireless communication environment, comprising:
   receiving first information indicating a set of thresholds uniquely configured for a group of base stations, wherein the set of thresholds is configurable by a network operator;
   receiving a feedback component from one or more user equipments (UEs) served by a base station, wherein the feedback component includes second information related to a path loss between the base station and the one or more UEs served by a cell associated with the base station;
   using the feedback component to detect a size of an area served by the cell at the base station, wherein the group of base stations includes the base station; and
   configuring an unconfigured cell size parameter at the cell with a value of a cell size as a function based upon comparing the size of the area served by the cell against the set of thresholds, wherein configuring the unconfigured cell size parameter is performed autonomously by the base station.

2. The method of claim 1, wherein the set of thresholds includes a first threshold, a second threshold greater than the first threshold, and a third threshold greater than the second threshold.

3. The method of claim 2, further comprising:
   configuring the value of the unconfigured cell size parameter as very small when the size of the area served by the cell is less than or equal to the first threshold;
   configuring the value of the unconfigured cell size parameter as small when the size of the area served by the cell is greater than the first threshold and the size of the area served by the cell is less than or equal to the second threshold;
   configuring the value of the unconfigured cell size parameter as medium when the size of the area served by the cell is greater than the second threshold and the size of the area served by the cell is less than or equal to the third threshold; and
   configuring the value of the unconfigured cell size parameter as large when the size of the area served by the cell is greater than the third threshold.

4. The method of claim 1, wherein the value of the unconfigured cell size parameter is configured as being one of very small, small, medium, or large.

5. The method of claim 1, wherein the value of the unconfigured cell size parameter is configured as being one of femto, pico, micro, or macro.

6. The method of claim 1, further comprising signaling the value of the configured cell size parameter from the base station to a neighboring base station.

7. The method of claim 6, further comprising signaling the value of the configured cell size parameter from the base station to the neighboring base station using an X2 application protocol (X2-AP).

8. The method of claim 6, further comprising signaling the value of the configured cell size parameter from the base station to the neighboring base station via a core network using an S1 application protocol (S1-AP).

9. The method of claim 1, wherein the feedback component further includes location information of the one or more UEs served by the cell.

10. The method of claim 9, further comprising:
    receiving the location information from the one or more UEs;
    computing a set of distances from the base station to the one or more UEs based upon the location information;
    generating a statistic based upon the set of distances; and
    detecting the size of the area served by the cell as a function of the statistic based upon the set of distances.

11. The method of claim 10, further comprising receiving the location information reported in measurement report messages (MRMs) from the one or more UEs.

12. The method of claim 10, wherein the statistic based upon the set of distances is one or more of a maximum distance, a minimum distance, a mean distance, a median distance, an Rth largest distance where R is an integer, or S standard deviations from the mean distance where S is a real number.

13. The method of claim 1, further comprising detecting the size of the area served by the cell as a function of a transmit power level of a reference signal sent by the base station.

14. The method of claim 1, further comprising detecting the size of the area served by the cell as a function of two or more of location information of one or more UEs served by the cell, a path loss between the base station and the one or more UEs served by the cell, or a transmit power level of a reference signal sent by the base station.

15. A method that facilitates network configuration in a wireless communication environment, comprising:
receiving information specifying receive power levels of a reference signal from one or more user equipments (UEs);
generating a set of path losses from a base station to the one or more UEs by comparing a transmit power level of the reference signal to the receive power levels of the reference signal;
generating a statistic based upon the set of path losses;
detecting a size of an area served by a cell associated with the base station at the base station as a function of the statistic based upon the set of path losses between the base station and the one or more UEs served by the cell; and
assigning a value of a network configuration parameter as a function of the size of the area served by the cell at the base station.

16. The method of claim 15, further comprising receiving the information specifying the receive power levels of the reference signal reported in measurement report messages (MRMs) from the one or more UEs.

17. The method of claim 15, wherein the statistic based upon the set of path losses is one or more of a maximum path loss, a minimum path loss, a mean path loss, a median path loss, a Tth largest path loss where T is an integer, or U standard deviations from the mean path loss where U is a real number.

18. A wireless communications apparatus, comprising:
a memory that retains instructions related to receiving first information indicating a set of thresholds uniquely configured for a group of base stations, wherein the set of thresholds is configurable by a network operator, receiving a feedback component from one or more user equipments (UEs) served by a base station, wherein the feedback component includes second information related to a path loss between the base station and the one or more UEs served by a cell associated with the base station, using the feedback component to determine a size of an area served by the cell, wherein the group of base stations includes the base station, and configuring an unconfigured cell size parameter at the cell with a value of a cell size as a function based upon a comparison between the size of the area served by the cell and the set of thresholds, wherein configuring the unconfigured cell size parameter is performed autonomously by the base station; and
a processor, coupled to the memory, configured to execute the instructions retained in the memory.

19. The wireless communications apparatus of claim 18, wherein the set of thresholds includes a first threshold, a second threshold greater than the first threshold, and a third threshold greater than the second threshold.

20. The wireless communications apparatus of claim 19, wherein the memory further retains instructions related to configuring the value of the unconfigured cell size parameter as very small when the size of the area served by the cell is less than or equal to the first threshold, configuring the value of the unconfigured cell size parameter as small when the size of the area served by the cell is greater than the first threshold and the size of the area served by the cell is less than or equal to the second threshold, configuring the value of the unconfigured cell size parameter as medium when the size of the area served by the cell is greater than the second threshold and the size of the area served by the cell is less than or equal to the third threshold, and configuring the value of the unconfigured cell size parameter as large when the size of the area served by the cell is greater than the third threshold.

21. The wireless communications apparatus of claim 18, wherein an enumerated set of possible values of the unconfigured cell size parameter includes very small, small, medium, and large.

22. The wireless communications apparatus of claim 18, wherein an enumerated set of possible values of the unconfigured cell size parameter includes femto, pico, micro, and macro.

23. The wireless communications apparatus of claim 18, wherein the memory further retains instructions related to signaling the value of the configured cell size parameter from the base station to a neighboring base station.

24. The wireless communications apparatus of claim 18, wherein the instructions related to receiving a feedback component further include location information of the one or more UEs served by the cell.

25. The wireless communications apparatus of claim 24, wherein the memory further retains instructions related to receiving the location information from the one or more UEs, computing a set of distances from the base station to the one or more UEs based upon the location information, generating a statistic based upon the set of distances, and determining the size of the area served by the cell as a function of the statistic based upon the set of distances.

26. The wireless communications apparatus of claim 18, wherein the memory further retains instructions related to determining the size of the area served by the cell as a function of a transmit power level of a reference signal sent by the base station.

27. The wireless communications apparatus of claim 18, wherein the memory further retains instructions related to determining the size of the area served by the cell as a function of two or more of location information of one or the more UEs served by the cell, a path loss between the base station and the one or more UEs served by the cell, or a transmit power level of a reference signal sent by the base station.

28. A wireless communications apparatus, comprising:
a memory that retains instructions related to receiving information specifying receive power levels of a reference signal from the one or more user equipments (UEs), generating a set of path losses from a base station to the one or more UEs by comparing a transmit power level of the reference signal to the receive power levels of the reference signal, generating a statistic based upon the set of path losses, determining a size of an area served by a cell associated with the base station as a function of the statistic based upon the set of path losses between the base station and the one or more UEs served by the cell, and configuring a value of a network configuration parameter as a function of the size of the area served by the cell; and
a processor, coupled to the memory, configured to execute the instructions retained in the memory.

29. A wireless communications apparatus that enables setting a parameter value in a wireless communication environment, comprising:
means for receiving first information indicating a set of thresholds uniquely configured for a group of base stations, wherein the set of thresholds is configurable by a network operator;

means for receiving a feedback component from one or more user equipments (UEs) served by a base station, wherein the feedback component includes second information related to a path loss between the base station and the one or more UEs served by a cell associated with the base station;

means for using the feedback component to detect a size of an area served by the cell at the base station, wherein the group of base stations includes the base station; and means for configuring an unconfigured cell size parameter at the cell with a value of a cell size based upon the size of the area served by the cell and the set of thresholds, wherein configuring the unconfigured cell size parameter is performed autonomously by the base station.

30. The wireless communications apparatus of claim 29, further comprising means for signaling the value of the configured cell size parameter to a neighboring base station.

31. The wireless communications apparatus of claim 29, wherein the set of thresholds includes a first threshold, a second threshold greater than the first threshold, and a third threshold greater than the second threshold.

32. The wireless communications apparatus of claim 29, wherein the set of thresholds includes distance thresholds.

33. The wireless communications apparatus of claim 29, wherein the set of thresholds includes path loss thresholds.

34. The wireless communications apparatus of claim 29, wherein the set of thresholds includes transmit power level thresholds.

35. A non-transitory computer-readable medium comprising:

code for receiving first information indicating a set of thresholds uniquely configured for a group of base stations, wherein the set of thresholds is configurable by a network operator;

code for receiving a feedback component from one or more user equipments (UEs) served by a base station, wherein the feedback component includes second information related to a path loss between the base station and the one or more UEs served by a cell associated with the base station;

code for using the feedback component to detect a size of an area served by the cell at the base station, wherein the group of base stations includes the base station; and code for configuring an unconfigured cell size parameter at the cell with a value of a cell size based upon the size of the area served by the cell and the set of thresholds, wherein configuring the unconfigured cell size parameter is performed autonomously by the base station.

36. The non-transitory computer-readable medium of claim 35, further comprising code for signaling the value of the configured cell size parameter to a neighboring base station.

37. The non-transitory computer-readable medium of claim 35, wherein the set of thresholds includes a first threshold, a second threshold greater than the first threshold, and a third threshold greater than the second threshold.

38. The non-transitory computer-readable medium of claim 35, wherein the set of thresholds includes distance thresholds.

39. The non-transitory computer-readable medium of claim 35, wherein the set of thresholds includes path loss thresholds.

40. The non-transitory computer-readable medium of claim 35, wherein the set of thresholds includes transmit power level thresholds.

41. A wireless communications apparatus, comprising:

a processor configured to:

receive one or more feedback components from one or more user equipments (UEs) served by a base station, wherein the feedback components include one or more of location information of one or more UEs served by the cell, and a path loss between the base station and the one or more UEs served by a cell associated with the base station;

use the feedback components to detect a size of an area served by the cell at the base station as a function of at least one of the feed back components; and configure an unconfigured cell size parameter at the cell with a value of a cell size as a function of a comparison between the size of the area served by the cell and a set of thresholds, wherein configuring the unconfigured cell size parameter is performed autonomously by the base station.

42. A wireless communications apparatus that enables setting a parameter value in a wireless communication environment, comprising:

means for receiving information specifying receive power levels of a reference signal from the one or more user equipments (UEs);

means for generating a set of path losses from a base station to the one or more UEs by comparing a transmit power level of the reference signal to the receive power levels of the reference signal;

means for generating a statistic based upon the set of path losses;

means for detecting a size of an area served by a cell associated with the base station at the base station as a function of the statistic based upon the set of path losses between the base station and the one or more UEs served by the cell; and means for configuring a value of a network configuration parameter based upon the size of the area served by the cell and a set of thresholds at the base station.

43. A non-transitory computer-readable medium comprising:

code for receiving information specifying receive power levels of a reference signal from the one or more user equipments (UEs);

code for generating a set of path losses from a base station to the one or more UEs by comparing a transmit power level of the reference signal to the receive power levels of the reference signal;

code for generating a statistic based upon the set of path losses;

code for detecting a size of an area served by a cell associated with the base station at the base station as a function of the statistic based upon the set of path losses between the base station and the one or more UEs served by the cell; and code for assigning a value of a network configuration parameter based upon the size of the area served by the cell and a set of thresholds at the base station.

* * * * *